May 10, 1927.
J. D. TEW
METHOD OF MAKING RUBBER TUBES
Filed April 13, 1925
1,628,286
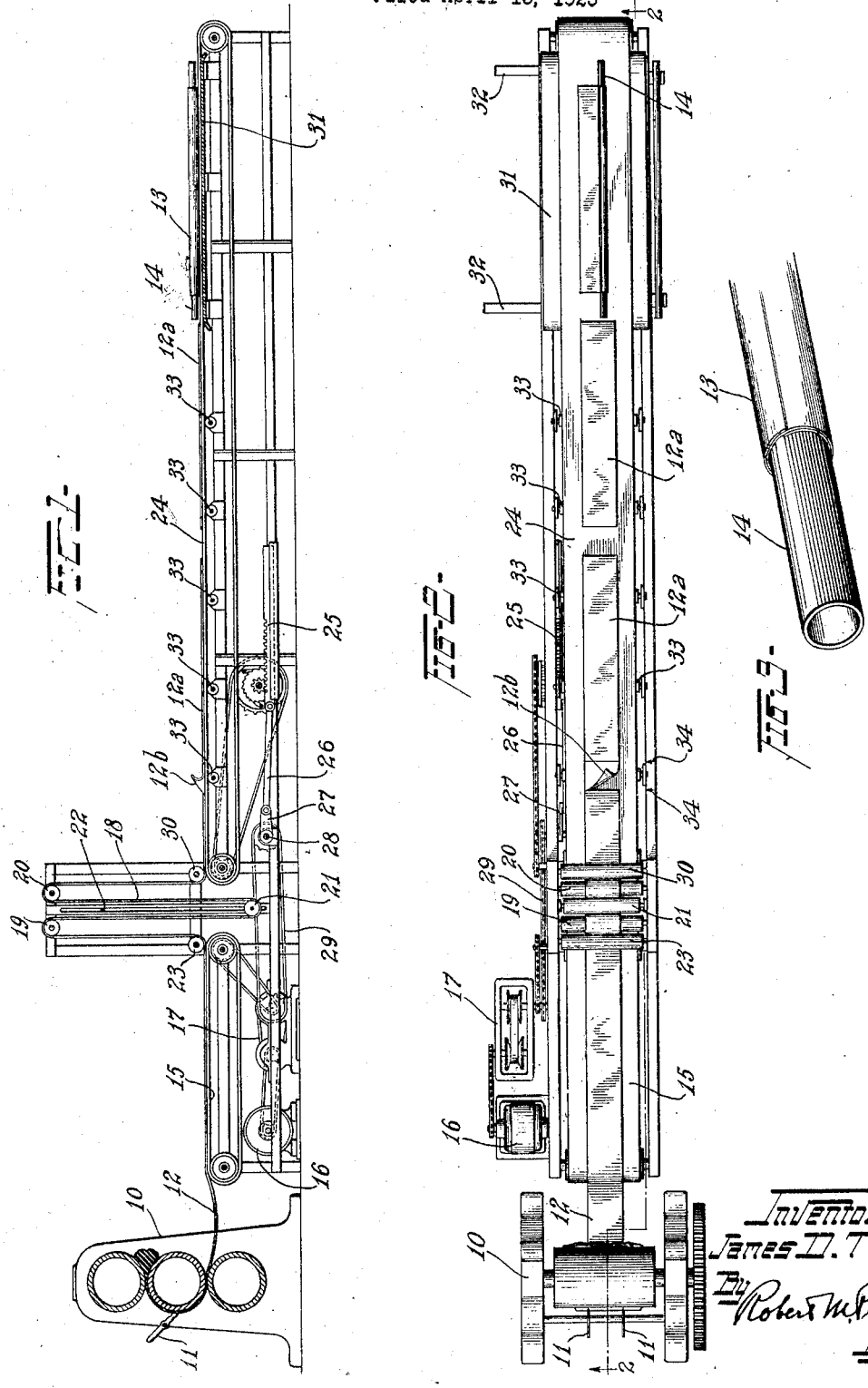

Patented May 10, 1927.

1,628,286

UNITED STATES PATENT OFFICE.

JAMES D. TEW, OF HUDSON, OHIO, ASSIGNOR TO THE B. F. GOODRICH COMPANY, OF NEW YORK, N. Y., A CORPORATION OF NEW YORK.

METHOD OF MAKING RUBBER TUBES.

Application filed April 13, 1925. Serial No. 22,549.

This invention relates to methods and apparatus for making rubber tubes such, for example, as are used as inner tubes for pneumatic tires.

My chief objects are to provide improved procedure and apparatus whereby the tubes may be rapidly and economically manufactured from material drawn from a source of supply as a continuous strip, and especially a source of supply such as a calender delivering the material continuously and at a substantially constant rate. Further objects are to eliminate the use of a liner for the handling of material such as rubber stock between the calendering thereof and its incorporation into the tube, and to eliminate reeling, storing and other operations heretofore commonly employed in the handling of the stock. Another object is to obtain improved adhesion of seams or laminations of the sheeted stock in the tube.

Of the accompanying drawings:

Fig. 1 is a side elevation, parts being shown in section, of the preferred apparatus embodying and adapted to carry out my invention.

Fig. 2 is a plan view of the same.

Fig. 3 is a fragmentary perspective view of an inner tube mandrel and a tube built thereon by the use of my invention.

Referring to the drawings, the apparatus comprises a calender 10 provided with slitting knives 11, 11 and adapted to deliver a strip of sheeted rubber stock 12 of suitable width to be wrapped into the form of a tube 13 upon a mandrel 14, as shown in Fig. 3. The strip 12 is here shown as being of such width as to provide a laminated tube, but the number of convolutions of stock in the tube is not material to my invention.

Mounted in suitable framing at the delivery side of the calender and adapted to receive the continuous stock strip 12 therefrom is an endless-belt conveyor 15 adapted to be continuously driven, by a motor 16, through a variable-speed drive 17, of known construction, to draw the stock strip 12 from the calender and deliver it continuously into a reserve loop or festoon 18, said reserve loop being supported by guide rolls 19, 20 journaled in a high part of the framing so as to provide for adequate length of the loop, and provided with a floating roll 21, having trunnions extending into vertical slots such as the slot 22 in the framing, for continuously drawing the strip into the reserve loop and permitting its intermittent withdrawal therefrom. A guide roll 23 is provided to compel horizontal movement of the strip to the delivery end of, and in driving engagement with, the conveyor 15, and vertical movement of the strip therefrom to the festoon-supporting roll 19, so that the inertia of the floating roll 21, in the rising and falling thereof will not, in changing the tension upon the strip, cause the latter to vary its course or the extent of its driving engagement with the conveyor 15.

For intermittently withdrawing the strip 12 from the reserve loop or festoon 18, in movements corresponding substantially to the length of the tube to be formed, and for conveying the stock to a tube rolling station, an endless-belt conveyor 24 is mounted in the framing and adapted to be intermittently driven by a ratchet-and-pawl, rack-and-pinion mechanism of which the rack is designated 25, said rack having connection through a pitman 26 with a crank 27 secured on a shaft 28 adapted to be driven, through a chain 29, from the end of the variable speed device 17 from which the conveyor 15 is driven, so that adjustment of the variable speed device may be employed to govern the speed of both the constantly driven conveyor 15 and the intermittently driven conveyor 24 in accordance with the speed of the calender, the drive ratio of the two conveyors being such that the intermittent withdrawal of stock by the conveyor 24 is substantially equivalent in rate of feed to the continuous feed of the conveyor 15, so that the floating roll may maintain throughout a long period of operation substantially the same range of rise and fall in its guide slots 22.

A guide roll 30 is journaled at the receiving end of the conveyor 24 and adapted to compel the strip to pass vertically downward from the guide roll 20 and horizontally onto the conveyor 24, so that variations of tension in the stock due to inertia of the floating roll 21 will not cause variation in the line of feed of the stock strip.

Mounted under the upper reach of the conveyor 24 adjacent the delivery end thereof is a table 31 adapted to support the overlying portion of the conveyor and thus provide a straight and flatly supported zone thereof for the tube rolling operation. Projecting laterally from the table are a pair of rails 32, 32 adapted to receive and support an accumulation of rolled tubes with the mandrels therein as the latter are rolled thereonto from the table, the said rails being suitably spaced apart to engage the end portions of the mandrels beyond the ends of the tubes mounted thereon.

A series of supporting rolls 33, 33 may be journaled on the frame under the upper reach of the conveyor 24 to prevent sagging of the portion thereof which carries the strip to the table 31 and so to maintain the strip in a substantially straight, horizontal condition for the performance of severing or blank-cutting operations thereon.

In the operation of the apparatus, the calender 10 being operated to deliver the strip 12, the latter is led onto the conveyor 15 with sufficient slack in the intermediate reach, as shown at the numeral 12 in Fig. 1, to avoid rupture of the strip in case the speed of the conveyors is not perfectly controlled, and the strip is led about the several rolls 23, 19, 21, 20 and 30 and started upon the conveyor 24 as shown clearly in Fig. 1, the floating roll 21 being given such initial position with relation to the intermittent drive mechanism of the conveyor 24 as to give it the proper range of rise and fall within the limits of the slots 22 in the subsequent intermittent feeding of the strip by said conveyor.

As the strip is carried forward on the conveyor 24 an operator severs it transversely to produce blanks 12$^a$, 12$^a$ of suitable length to be rolled upon respective mandrels such as the mandrel 14, preferably cutting out and returning to the calender intervening zones of stock such as 12$^b$, between the successive blanks, so that each blank 12$^a$ in its original relative position upon the conveyor may be rolled, when it arrives over the table 31, upon a mandrel of greater length than the blank, to leave the end portions of the mandrel exposed, for convenient handling of the assembly, without the mandrel coming into contact with the next blank. The transverse cuts are made at such positions upon the conveyor with relation to the latter's intermittent feed, such positions being marked as by the arrows 34, 34 upon the frame of the machine, that each blank stops over the table 31 for the rolling operation between successive feeding movements of the conveyor. As each blank so stops, a mandrel 14, is rolled upon it and picks it up in the form of a tube, and the mandrel with the tube thereon is rolled onto the storage rails 32.

The operation is rapid and economical and the stock is wrapped upon the mandrel while it is still in a fresh and tacky condition from the calendering thereof, so that good adhesion of seams or of plies is obtained.

My invention is susceptible of modification within the scope of the appended claim, and is not intended to be limited by said claim except as may be required by prior art.

I claim:

The method of making rubber tubes which comprises forming successive elongated blanks of warm and tacky rubber stock, longitudinally feeding the said blanks of stock in procession to a rolling position without intermediate storage of the blanks, and there mounting each blank upon a mandrel by rolling the mandrel transversely upon the blank, the blanks being formed in spaced-apart relation in procession by severing and removing zones of stock from a continuous strip of stock.

In witness whereof I have hereunto set my hand this 9th day of April, 1925.

JAMES D. TEW.